3,521,278
SYNCHRONIZED VORTAC/TACAN CAS SYSTEM
Lewis Michnik, Buffalo, and Johannes W. Prast, Grand Island, N.Y., assignors to Sierra Research Corporation, a corporation of New York
Filed Aug. 20, 1968, Ser. No. 754,074
Int. Cl. G01s 9/00, 9/02
U.S. Cl. 343—6                                                3 Claims

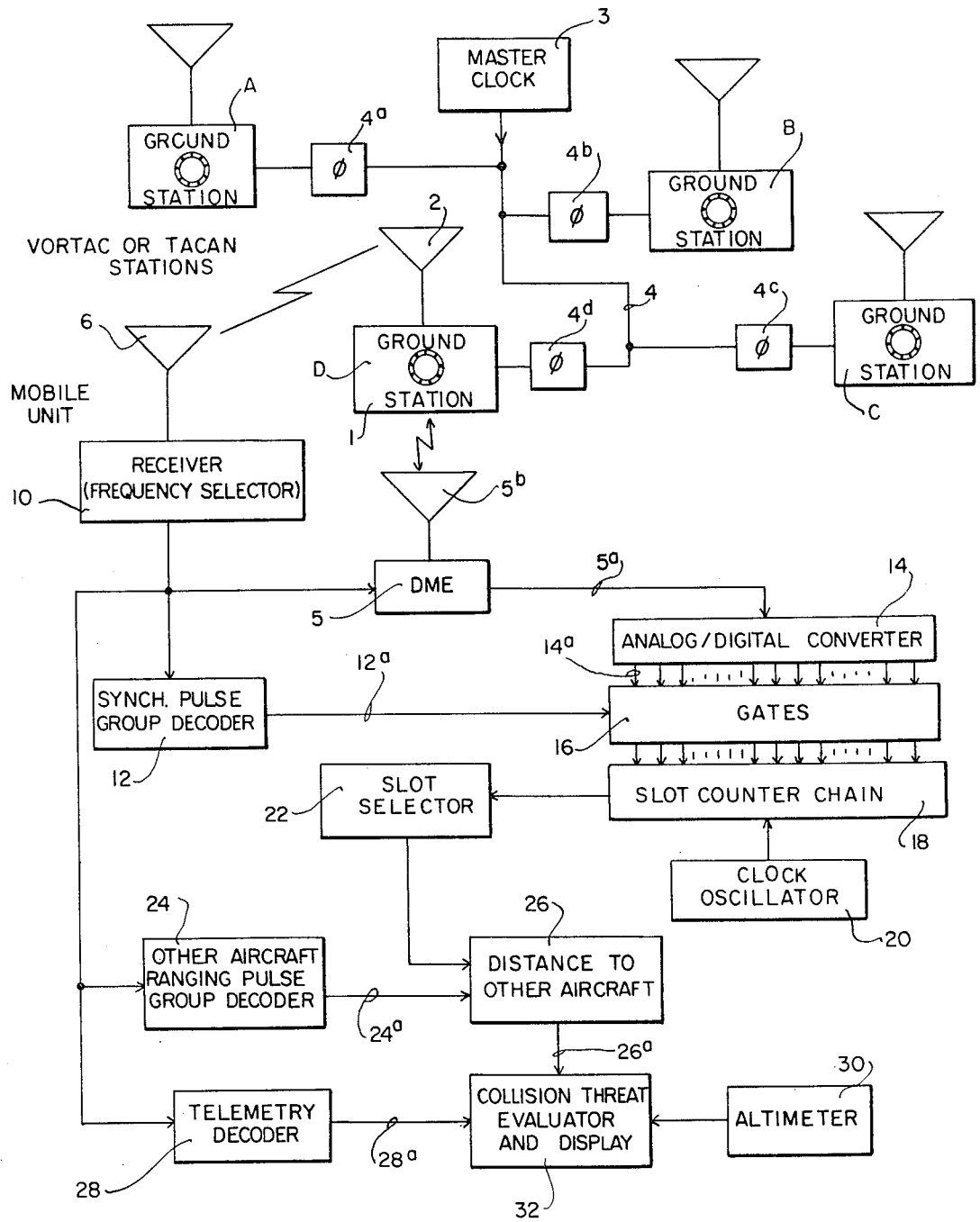

ABSTRACT OF THE DISCLOSURE

In the context of a collision avoidance system (CAS) involving mobile units such as aircraft operating in time slots and accurately synchronized to an established CAS-worldwide time kept by ground station units, the illustrative embodiment shows a system in which the ground stations comprise VOR/DME, VORTAC or TACAN units which have been augmented by the addition of accurate time clocks such as atomic clocks all synchronized to said worldwide time, thereby permitting all of these ground stations to transmit mutually synchronized pulse groups. The system further provides means for permitting the various mobile units to participate in the synchronized collision avoidance system by using their ordinary distance measuring equipment (DME) to measure ranges to selected ground stations, and then to insert these measured ranges into their clock corrective systems to accurately synchronize them to the fixed stations' next CAS synchronization pulze groups, using the inserted ranges to correct for transit times of the transmitted pulse groups from the fixed station to the various mobile units. The embodiment permits the aircraft, when synchronized via the DME, to use CAS ranging pulse groups transmitted by other aircraft in the latter's own time slots to evaluate threat of collision therewith.

---

This invention relates to airborne collision avoidance systems (CAS) and more particularly to a network of highly synchronized time clocks combined with VOR/DME TACAN and VORTAC ground stations whose distance measuring equipment (DME) is then used co-operatively by DME located in the various mobile units, such as aircraft, for synchronizing the clocks carried by the mobile units with the established worldwide time. Such synchronization is accomplished by using the DME in the mobile unit to determine a time factor related to range to a selected fixed station whose transmission include pulses synchronized to CAS worldwide time thereby to determine the signal propagation time to the mobile unit from the station, and then using this time factor together with periodic synchronization signals transmitted by the ground station to correct any difference between its time clock and the clock in the mobile unit.

This invention will be described against the background of specifications issued by the Air Transport Association of America (ATA) for a collision avoidance system (CAS) designed primarily to be used by commercial carrier aircraft, in which a network of fixed-position ground-station units are all very accurately synchronized together, within approximately one-half microsecond, to establish a worldwide time system to which the aircraft then synchronize themselves. Each aircraft which is equipped to participate in the system occupies its own time slot, and at a predetermined instant within that time slot it transmits its own CAS ranging signal comprising a coded pulse group, as well as other signals as described in the specification. Other aircraft receiving that ranging signal can determine the range to the transmitting aircraft by determining the transit time of the signal as measured by their own clocks. The fixed stations in said network transmit clock synchronizing pulse groups to mobile units during the first time slot in every second repeating of time slots, the first such slot being designated as slot 0000. The ATA specification also provides for the possibility of the design of limited equipments for smaller aircraft omitting as many of the complexities as possible, but retaining limited capabilities for operation in a so-called "back-up" mode which may be acceptable to some categories of users. The ATA specification proposes the building of a large number of accurately synchronized ground stations, probably each including an atomic clock, and means for keeping them mutually synchronized, and further proposes to add to each fully-equipped aircraft and to each ground station a complex synchronization system for exchanging pulses for the purpose of compensating for the propagation delay of the synchronizing pulse group which is periodically transmitted by the ground station to the aircraft in question, perhaps once per two epochs. Typical examples of the type of sophisticated pulse exchange equipment necessary to eliminate the propagation time delay and thereby achieve mobile-unit clock synchronization are shown in Michnik et al. Pat. No. 3,336,591, Perkinson Pat. No. 3,250,896, Graham Pat. No. 3,183,504, Minneman Pat. No. 2,869,121, etc. These are complex and expensive systems.

It is a principal object of the present invention to use the existing capability of VOR/DME, VORTAX or TACAN ground stations to provide accurate distance measurements to the mobile units in place of said complex pulse-exchange systems, and to thereby simplify the over-all system without degrading its performance. The present invention teaches that only part of the formerly proposed CAS equipment need be added to VOR/DME VORTAC and TACAN systems, the added equipment including a synchronized time clock, and means for transmitting coded synchronizing pulse groups. The important advantage to be derived from combining the proposed CAS facility with existing VOR/DME, VORTAC or TACAN stations resides in the fact that each VOR/DME VORTAC or TACAN already includes the capability of providing range measurements to aircraft, and furthermore most aircraft of any size already include the necessary mobile DME unit required to cooperate with these existing ground stations.

In copending patent application Ser. No. 710,990, filed Mar. 6, 1968, now Pat. 3,458,861, Lewis Michnik discloses a unit to be carried by an aircraft and used to acquire synchronization with a ground station's worldwide time in the particular case where there happens to be a VOR/DME, TACAN or VORTAC located near the CAS ground station, such aircraft using its conventional DME to measure range to that station, instead of having to use the more complex and expensive pulse-exchange systems mentioned above to compensate for the propagation time of the ground station's synchronizing pulse group to the aircraft.

It is another important object of the present invention to provide a system wherein, despite considerable simplification, the ultimate degree of mobile clock synchronization is not degraded, and may even be improved. Large commercial air transport planes and military craft will in any event carry atomic clocks, and according to the ATA proposal, these larger aircraft would exchange time among themselves and with other lesser-equipped aircraft for the purpose of spreading and improving said worldwide time. It would therefore follow that some aircraft would have been synchronized, not directly to a primary CAS standard ground station, but only secondarily to other aircraft and, therefore, their synchronization errors could be multipled. However, according to the present invention, all participating aircraft would use the DME to determine range and therefore to make any necessary corrections in their time clocks while over continental areas. It is assumed that over large marine areas only very fully-equipped aircraft carrying atomic clocks would venture, and their clocks would require no moment-to-moment resynchronization subsequent to leaving the range of DME coverage. The present generation of DME units provide a range accuracy of 250 to 1200 feet, and this accuracy is capable of providing synchronization to less than two microseconds, an ultimate capability which is better than that required by the ATA specification for participation.

Still another advantage of the present invention is that all synchronization can be accomplished on DME frequencies. According to the ATA specification, it is proposed that each fully-equipped aircraft be able to operate on at least four different frequency channels during back-up mode functions. This capability imposes the requirement that the fully-equipped aircraft must be able to pass on synchronization on all four frequency modes. Since the present invention teaches synchronization directly from a participating VOR/DME VORTAC or TACAN station, rather than secondarily from another aircraft, the CAS requirement can be reduced to a single back-up mode frequency.

Another substantial advantage of the present invention over the proposed ATA system, in which fully-equipped aircraft would synchronize aircraft having more limited equipment resides in the fact that the liability responsibility for the accuracy of such synchronizations no longer falls upon the airliners, but under the present invention will be the responsibility of the government controlled ground stations which are fewer in number so that greater accuracy can be maintained on a continuous basis with far fewer problems from the point of view of supervision.

Considering the administrative problems involved in building an operational system throughout the world, it is also a great advantage of the present invention that there are many stations similar to VOR/DME, VORTAC or TACAN already in existence around the world and under control of established authorities who can be directly dealt with for the purpose of getting clock synchronization systems added, and at a cost which is low as compared with the proposed synchronization systems mentioned in the previous paragraph.

When an accurate time clock synchronized with CAS worldwide time is added to a VOR/DME, VORTAC or TACAN ground station, coded pulse groups that are synchronized with CAS signals can be included in the regular transmissions on a non-interfering basis. The normal transmissions from VORTAC or TACAN stations contain reference transmissions occurring in synchronism with their rotating antenna patterns. In such a case, the CAS groups could be made part of the antenna reference bursts, perhaps providing one or more synchronizing pulses for every rotation of the antenna pattern, and special groups every three seconds (45 rotations) and every six seconds to correspond with odd numbered CAS three-second epochs. The CAS time clock, in this case, would be used to synchronize the rotating antenna patterns of the stations. On the other hand, the CAS synchronization pulses could be transmitted on a different frequency from the frequency of the existing rotating antenna patterns if mutual synchronization were not desired.

The exact means by which synchronization is achieved for the accurate time clocks located at the various VOR/DME, VORTAC or TACAN stations forms no part of the present invention, and may be the same scheme as would be used to synchronize master ground CAS stations as proposed by the ATA specification. For instance, the stations might be interconnected by wires or by satellites using time delay phasing circuitry, or they might be synchronized by pulse schemes of the type for instance suggested by Minneman Pat. No. 2,869,121. As a further alternative, they might be synchronized by atomic clocks physically carried from one location to another by an aircraft, the latter scheme being workable to span a large uninhabited area, such as a desert or an ocean.

On the other hand, if the above-mentioned ATA system prevails wherein the lesser-equipped aircraft derive synchronization from larger aircraft, then the present system can be used by lesser aircraft as a secondary means by which to maintain accurate time by using various DME ground stations during intervals between acquisitions of synchronization from atomic-clock-carrying major airliners. For instance, an aircraft with limited equipment may require resynchronizing every few minutes, because it may employ an inexpensive crystal oscillator as a clock pulse source. Thus, it cannot obtain close synchronization from a fully-equipped airliner often enough to maintain satisfactory continuous synchronization with worldwide time. Therefore, it will use its DME, operating according to the present invention, to reset its clock at frequent intervals. Occasionally, however, when it passes within range of an airliner, it can obtain accurate clock synchronization by which it can check the accuracy of the synchronization which it achieves using its DME. Any errors found to be introduced by the latter process can therefore be calibrated out using the signal from the airliner to check the degree of accuracy. This system is proposed as a possible interim use of the invention as an alternative to having all aircraft use only the DME to achieve in-flight clock synchronization from synchronized VOR/DME, VORTAC or TACAN stations.

It is a more specific object of the present invention to insert a time value as measured by the DME into the aircraft's system and then to subsequently use the reception at the aircraft of the next-received synchronizing signal from the selected ground station and the slot counter in the aircraft to commence keeping time from the inserted value.

Although the present invention is discussed in terms of VOR/DME, VORTAC and TACAN stations being synchronized with worldwide time for CAS purposes, the invention is not to be limited strictly to these particular types of navigational aids; but is useable in cooperation with any other distance measuring system which will provide a mobile unit with reliable distance measurements to an accurate clock.

Other objects and advantages of the invention will become apparent during the following discussion of the drawing, which shows a block diagram representing an illustrative embodiment according to the present invention.

Referring now to the drawing, the upper portion thereof shows four fixed ground units A, B, C and D, each of which comprises a VOR/DME or VORTAC or TACAN station. Each unit includes an antenna 2 which is used by the distance measuring transponder equipment of the ground unit and which can also be used to transmit the coded CAS synchronization signals, although a separate antenna (not shown) can be used if desired. The various VOR/DME, VORTAC or TACAN units are provided with means for keeping their local clocks, represented by the reference numeral 1 in unit D, accurately synchronized to worldwide time as determined by a master clock 3, this synchronizing means being represented in the present embodiment by a cable 4 interconnecting the various ground stations with the clock 3 and including phase corrective devices 4a, 4b, 4c and 4d respectively, so that the clocks at the various ground stations are all exactly synchronized.

Although the present invention is discussed in terms of the ground stations synchronized with worldwide time, the invention is not to be limited strictly to this precise mode of time division. In particular, it may be useful to establish a local (CAS) time in isolated areas, and/or island communities, where synchronization to worldwide (CAS) time is impractical for economic reasons or reasons of priority, but where considerable local traffic exists. In this event, the local DME station (or stations)

equipped with a reference atomic clock, or crystal clock, or synchronized with a CAS master ground station that is so equipped, may provide the synchronization function.

A typical mobile unit equipment is shown in the lower portion of the figure, and includes an antenna 6 connected to suitable receiver means 10 which also includes frequency selector circuits by which a particular one of the illustrated ground stations can be selected to the exclusion of other ground stations which may also be within radio range. The mobile unit further includes its own conventional DME 5, which may comprise either a separate equipment, for instance, one already installed in the aircraft and having its own antenna 5b, or it may be an integral part of the whole CAS package installed in the mobile unit and using the unit's antenna 6 for the purpose of adding to that package the distance measuring circuits of an ordinary DME. In either case, it delivers on wire 5a a signal which gives a direct measure of the distance from the mobile unit to the selected ground station D. The signal on wire 5a may be either analog or digital, according to the prior art which will be discussed hereafter.

Assuming now that the various VOR/DME, VORTAC or TACAN ground stations are all precisely synchronized to worldwire time, a mobile unit can synchronize to the same time, provided it receives synchronization pulses from a selected ground station and provided it also knows its propagation delay time to that station. According to the ATA specification, a coded group of synchronization signals is transmitted at a predetermined instant near the beginning of the first time slot 0000, once every other epoch of time slots, this pulse group being transmitted for instance on the antenna 2 and being recognized and decoded by the SYNCH signal decoder 12 at the receiver. Assuming that the range has previously been measured by the DME 5, and appears in this example as an analog signal on wire 5a, this signal is delivered to an analog/digital converter 14 providing a number of binary outputs 14a which can be connected through a like number of gates 16, when enabled, to preset a time-slot counter chain 18, which is driven by clock oscillator 20. In an aircraft having somewhat limited equipment, the latter will probably comprise a good grade of crystal oscillator whose performance is capable of maintaining adequate synchronization for only a few minutes for the purpose of determining the time slots required for collision avoidance.

The analog/digital converter 14 includes internal logic circuitry by which a number of binary outputs on wires 14a can be made to provide a compensating factor comprising a digital signal representing the range-analog appearing on wire 5a. Within the time slot 0000 the ground station's SYNCH signal group is transmitted at a preselected moment and is then received in the mobile unit and decoded by its decoder 12 at a time which is later than said moment of transmission by the propagation time of the signal over the range to that mobile unit. When the SYNCH signal is decoded on wire 12a, it enables the gates 16 to couple the binary outputs on wires 14a to preset the positions of the binary devices in the slot counter chain 18 to a number corresponding with the range delay measured by the DME 5. Thus, with this binary sequence always appearing at the outputs 14a of the converter 14, whenever a SYNCH signal appears on the wire 12a, the gates 16 are enabled to set these binary readings into the slot counter chain 18, so that at that moment the chain 18 will read precisely in step with worldwide time. The chain is now synchronized and will remain in reasonable synchronization for a few minutes, at least well beyond the time when the next synchronization cycle of the above type takes place. Such synchronization should take place in time slot 0000 and since an epoch is only three seconds long, the resynchronization process can easily be programmed to occur only once every 2, 10, 100, etc. epochs.

A suitable means for acquiring an operational time slot for each mobile unit or for recognizing the slots occupied by other units is contained within the slot selector box 22, although the details thereof form no part of the present invention. An especially useful means for selecting an unoccupied time slot for the local unit is shown in Chisholm Pat. No. 3,161,869, although pre-assigned slots may also be used, for instance, in the manner suggested in Fletcher Pat. No. 3,153,232, and in others.

During the unit's own time slot, it will transmit its own position-marker pulse group at a predetermined moment as set forth in the ATA specification, but during other time slots, it will receive and decode via the decoder 24, the ranging pulse groups transmitted by other aircraft respectively, occupying those other slots. The reception of another unit's coded pulse group causes a signal to appear on wire 24a marking the position in that unit's time slot at which the signal transmitted by that unit locally is received, and the circuit 26 will measure the time elapsing between the known moment of transmission of the ranging pulse group by the other unit and its appearance locally on wire 24a. This tie difference will appear as an output sigal on wire 26a, indicating range to the transmitting unit, or in a more sophisticated system it may be augmented to indicate range rate. The local aircraft unit may also receive and decode signals telemetered by the other aircraft unit, a decoder 28 providing on wire 28a other useful data, for instance, indications of the identity and/or altitude of the other aircraft, or Doppler rate signals. The local aircraft unit may also be provided with an altimeter 30 having an output on wire 30a. All this information appearing on wires 26a, 28a and 30a is then fed into a Threat of Collision evaluator 32 having a suitable readout, or warning display.

The circuits performing the actual measurements of range to another aircraft, range rate, altitude, etc., are only mentioned for the sake of showing utility of the system, but the present invention relates mainly to synchronizing of DME ground stations and to the subsequent use thereof to cooperate in the synchronization of the local time clock in a mobile unit to the worldwide time to which the ground stations are all synchronized, as set forth in the paragraphs above. A more detailed discussion of the operation of the illustrative clock-synchronizing equipment located in the mobile unit is included in the above-mentioned copending application Ser. No. 710,990 now Pat. 3,458,861. However, the present invention is intended to include various other schemes for correcting a mobile clock to synchronize it with a remote clock which is separated by a known range, and in response to synchronizing pulses exchanged therebetween.

This invention is not to be limited to the exact embodiment shown in the drawing, for obviously changes can be made therein within the scope of the following claims.

We claim:
1. In a navigation and collision avoidance system, the combination of:
   (a) multiple participating VOR/DME, VORTAC or TACAN type fixed-position stations each having transmitting and receiving means comprising DME to be interrogated by participating mobile units on different frequencies by which the ground stations are distinguished;
   (b) master clock means on the ground and operative to count out time cycles recurring after a predetermined instant in each cycle;
   (c) means for linking the master clock means to the ground stations to actuate the ground stations to transmit mobile unit synchronizing signals at said predetermined instants;
   (d) each participating mobile unit including DME means cooperative with said ground-station DME and including frequency selective receiver means for selecting one particular ground station to which to synchronize;

(e) clock means in each participating mobile unit for counting out repeating time cycles having predetermined instants similar to said ground station cycles, the clock means being settable to correct its clock count during each cycle;
(f) means in each participating mobile unit responsive to DME measured distance to determine a clock count representing the propagation time delay of a synchronizing signal transmitted at said instant to the mobile unit from the selected ground station; and
(g) means responsive to reception at the mobile unit of a synchronizing signal for setting the mobile unit clock means to said determined clock count.

2. In a system as set forth in claim 1, said means for linking said master clock means to the ground stations including phase corrective devices operative to actuate the participating ground stations to transmit said synchronizing signals simultaneously.

3. In a system as set forth in claim 1, said clock means counting out standardized repeating epochs of time slots, and said epochs recurring cyclically between successive ones of said predetermined instants when said ground stations are actuated to transmit synchronizing signals.

References Cited

UNITED STATES PATENTS

| | | | |
|---|---|---|---|
| 2,869,121 | 1/1959 | Minneman et al. | 343—103 |
| 3,250,896 | 5/1966 | Perkinson et al. | |
| 3,336,591 | 8/1967 | Michnik et al. | 343—6.5 |
| 3,341,812 | 9/1967 | Perkinson et al. | |
| 3,434,140 | 3/1969 | Chisholm | 343—6 |
| 3,440,652 | 4/1969 | Bates et al. | 343—7.5 |

RICHARD A. FARLEY, Primary Examiner

M. F. HUBLER, Assistant Examiner

U.S. Cl. X.R.

343—7.5